(12) United States Patent
Gray et al.

(10) Patent No.: US 9,218,114 B1
(45) Date of Patent: Dec. 22, 2015

(54) PROVIDING TIME-DEPENDENT ITEMS

(75) Inventors: Timothy T Gray, Seattle, WA (US); Keela N Robison, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 37 days.

(21) Appl. No.: 13/603,259

(22) Filed: Sep. 4, 2012

(51) Int. Cl.
*G06F 3/048* (2013.01)
*G06F 3/0484* (2013.01)
*G06Q 10/10* (2012.01)

(52) U.S. Cl.
CPC .......... *G06F 3/04845* (2013.01); *G06Q 10/109* (2013.01)

(58) Field of Classification Search
CPC .......................... G06F 3/04845; G06Q 10/109
USPC .................. 715/653, 655, 771; 345/653, 655
See application file for complete search history.

(56) References Cited

U.S. PATENT DOCUMENTS

| | | | | |
|---|---|---|---|---|
| 4,430,004 | A * | 2/1984 | Nitschke | 368/235 |
| 6,593,942 | B1 * | 7/2003 | Bushmitch et al. | 715/721 |
| 8,237,655 | B2 | 8/2012 | Yabe et al. | |
| 8,526,675 | B2 | 9/2013 | Ruan | |
| 8,627,236 | B2 * | 1/2014 | Jung et al. | 715/863 |
| 2003/0007420 | A1 * | 1/2003 | Shteyn | 368/10 |
| 2006/0034161 | A1 * | 2/2006 | Muller | 368/281 |
| 2006/0168545 | A1 * | 7/2006 | Niittynen et al. | 715/848 |
| 2007/0199021 | A1 * | 8/2007 | Kim et al. | 725/39 |
| 2008/0022365 | A1 | 1/2008 | Chae et al. | |
| 2008/0186275 | A1 | 8/2008 | Anderson | |
| 2009/0077570 | A1 * | 3/2009 | Oral et al. | 719/318 |
| 2010/0157742 | A1 * | 6/2010 | Relyea et al. | 368/28 |
| 2011/0211754 | A1 | 9/2011 | Litrak et al. | |
| 2011/0261048 | A1 * | 10/2011 | Lee et al. | 345/419 |
| 2012/0056878 | A1 * | 3/2012 | Miyazawa et al. | 345/419 |
| 2012/0066629 | A1 * | 3/2012 | Lee et al. | 715/769 |
| 2012/0066648 | A1 | 3/2012 | Rolleston et al. | |
| 2012/0084734 | A1 | 4/2012 | Wilairat | |
| 2012/0154301 | A1 | 6/2012 | Kang et al. | |
| 2012/0154378 | A1 | 6/2012 | Kitchens | |
| 2012/0197998 | A1 | 8/2012 | Kessel et al. | |
| 2013/0004016 | A1 | 1/2013 | Karakotsios et al. | |
| 2013/0170324 | A1 * | 7/2013 | Tu et al. | 368/28 |
| 2013/0235069 | A1 | 9/2013 | Randy Ubillos et al. | |

OTHER PUBLICATIONS

Rip Empson, "Read Offline: News.me Automatically Downloads Your News Whenever You Leave Home", "TechCrunch", Apr. 22, 2012, p. 2, Publisher: www.TechCrunch.com, Published in: US.

(Continued)

*Primary Examiner* — Jennifer To
*Assistant Examiner* — John Repsher, III
(74) *Attorney, Agent, or Firm* — Athorus, PLLC

(57) ABSTRACT

This application describes, in part, systems and methods for rotating a graphical representation of a three-dimensional object, such as a clock, to expose a side surface area and display time dependent information on the side surface area. For example, a displayed clock may be graphically rotated such that a side surface area adjacent to the times between 6:00 and 12:00 are exposed. If the current time is between 6:00 a.m. and 12:00 p.m. time-dependent items between 6:00 a.m. and 12:00 p.m. are obtained and displayed at positions on the side surface area to correspond with the scheduled time for those time-dependent items. If the current time is between 12:00 a.m. and 6:00 a.m. time-dependent items for the upcoming hours between 6:00 a.m. and 12:00 p.m. are obtained and displayed.

21 Claims, 8 Drawing Sheets

(56) References Cited

OTHER PUBLICATIONS

U.S. Appl. No. 12/180,325, filed Jul. 25, 2008, Narasimhan et al., "Communication Management Based on Communication Events."

U.S. Appl. No. 13/352,087, filed Jan. 17, 2012, Zhou et al., "Managing Resource Usage for Task Performance."

U.S. Appl. No. 13/552,213, filed Jul. 18, 2012, Dong Zhou et al., "Custom Color Spectrum for Skin Detection."

* cited by examiner

PROVIDING TIME-DEPENDENT ITEMS

BACKGROUND

People are increasingly interacting with computers and other electronic devices in new and interesting ways. With the continued increase of processing power and content stored on portable devices, there is a growing need for additional techniques to provide information to users of those devices. Most devices include a locked and unlocked state and some provide minimal information when in a locked stated. For example, some devices may provide time, date and/or remaining battery life information when in a locked stated. However, if the user desires to obtain additional information, they must unlock the device and access the appropriate application to obtain additional information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
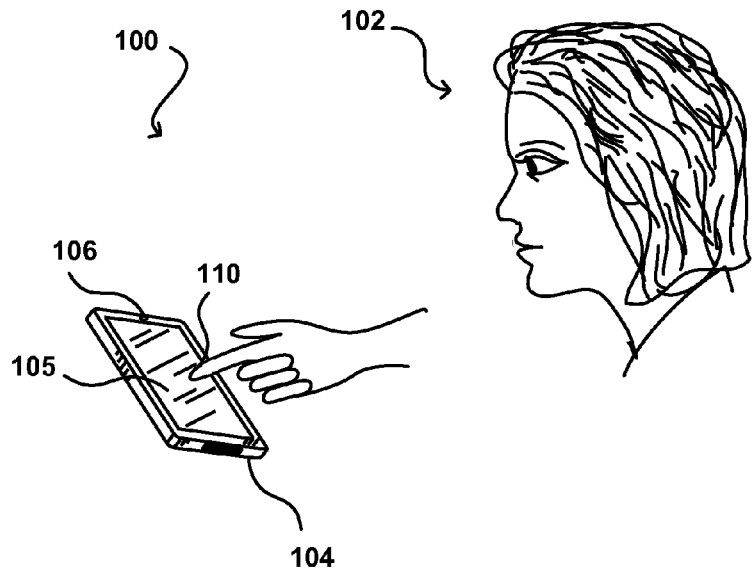
FIG. 1 illustrates an example environment in which various aspects can be used in accordance with various implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes, in part, systems and methods that may be used to provide time-dependent items, such as calendar entries or tasks, to a user of a device. In some examples, when the device is in a locked or low power state, a graphical representation of a three-dimensional clock (e.g., an analog desk or wall clock) may be presented on a display of the device. The user may rotate the device and the clock will rotate on the display to show a side of the clock. The side of the clock may display time-dependent items, such as calendar items (e.g., meetings) for the user for the current six-hours or the upcoming six hours, depending on the time of day and the rotation of the clock. For example, if it is 6:10 a.m. and the user rotates the device to see the side of the clock corresponding to the time between 6:00 and 12:00 the user will be provided with calendar items occurring between 6:00 a.m. and 12:00 p.m. (the current six hours). If the user rotates the device to see the side clock corresponding to the time between 12:00 and 6:00 the user will be provided with the calendar items occurring between 12:00 p.m. and 6:00 p.m. (the upcoming six hours).

In some implementations, the user may be able to rotate the device to see any side of the clock that corresponds with six hours on the face of the clock and be provided with time-dependent items, such as calendar items, relating to those six hours (either current or upcoming). Depending on the current time, the exposed side of the clock will provide calendar items relating to either the current six hours (past and present) or the upcoming six hours associated with corresponding six hours on the face of the clock. For example, if the current time is 9:00 a.m. and the user rotates the device such that the side of the clock that corresponds to the time between 8:00 and 2:00 is exposed, the presented time-dependent items will include items occurring between 8:00 a.m. and 2:00 p.m.—the current six hours. Likewise, if the current time is 9:00 a.m. and the user rotates the device such that the side of the clock that corresponds to the time between 10:00 and 4:00 is visible, the presented time-dependent items will include items occurring between 10:00 a.m. and 4:00 p.m.—the upcoming six hours.

In other implementations, time-dependent items may be any time based information. For example, the time-dependent items may be corresponding times in different time zones, tasks that are to be completed by specific times, scheduled alarms or events that are to occur at a specific time, weather, news, and the like. Likewise, while the example described above relates to providing time-dependent items while the device is in a locked state, these implementations are equally applicable to other states of device operation. For example, implementations described herein may be used when the device is in an unlocked state to provide time-dependent items to a user. Likewise, the implementations described herein may be implemented as an application running on or provided to the device. In general, the implementations described herein provide the ability for users to easily obtain any form of time-dependent items.

The input that causes the graphical representation of the object (e.g., clock) to rotate may be received via one or more input components. For example, as discussed above, a user may physically rotate the device and an accelerometer or gyroscope within the device may be used as the input component that detects the rotation and provides instructions to graphically rotate the representation of the object. Other input components that may also receive a rotation request or rotation input include, but are not limited to, a touch-based display (e.g., resistive, capacitive, Interpolating Force-Sensitive Resistance (IFSR)), camera (for facial tracking, gaze tracking, head tracking, feature tracking, expression recognition, facial recognition, light detection), accelerometer, gyroscope, inertial sensor, pressure sensor, microphone, compass or any combination thereof. One or more of these input components may be included on a device or otherwise in communication with the device.

FIG. 1 illustrates an example situation 100 wherein a user 102 would like to provide touch-, gesture- and/or motion-based input to a computing device 104 to rotate a graphical representation of an object and obtain time-dependent items. Although a portable computing device (e.g., a smart phone, an e-book reader, or tablet computer) is shown, it should be understood that various other types of electronic devices that are capable of receiving and processing input can be used in accordance with various implementations discussed herein. These devices can include, for example, desktop computers, notebook computers, personal data assistants, cellular phones, video gaming consoles or controllers, and portable media players, among others. In this example, the computing device 104 has at least one camera 106 (e.g., a digital still camera, video camera, optical sensor, or other such image capture element) operable to perform image capture over an associated capture range. The camera may be capable of capturing information in both the visible light spectrum as well as other ranges of the electromagnetic spectrum. Each image capture element may be, for example, a charge-coupled device (CCD) or complimentary metal-oxide semi-conductor (CMOS) sensor, for example, or can utilize another appropriate image capturing technology.

The computing device 104 may also include an accelerometer (not shown), such as a micromachined accelerometer, as an input component for use in detecting a position or rotation of a device. For example, an accelerometer may be utilized to receive a rotation request in response to a user rotating the device in a particular direction.

The computing device 104 may also include a touch-based display 105 operable to display graphical representations of objects and to receive touch-based user input from a user of the device. The touch-based display 105 may receive touch-based inputs and determine the corresponding three-dimensional positions (x, y, z positions) of a user's input on a graphical representation of an object. In some implementations, ray casting or ray tracking may be used to cast a virtual ray from the point on the touch-based display into the scene to determine the x, y, z positions on the graphical representation of the object that correspond with the input. For example, if a user input, such as a rotation request or a details request for detail information about an item (discussed below), is received through a touch-based display, the point on the display where the user is touching the display and a direction, such as perpendicular to the surface of the display, may be used to construct a ray that is virtually cast into the scene and onto the object to determine the x, y, z positions on the graphical representation of the three-dimensional object. Likewise, if the input is received from a camera and processed to provide gaze tracking, a ray may constructed based on the point on the display where the user is looking and a direction extending into the scene from the user's eyes (e.g., the center point between the user's eyes) through that point on the display. In such an example, the direction of the ray may not be perpendicular to the surface of the display. If the input is head tracking, a ray may be constructed based on a point on the display (e.g., the center of the display) and a direction extending into the scene from a point on the user's head through the point on the display. Similar to gaze tracking, the direction of the virtual ray may not be perpendicular to the display surface. It will be appreciated that other techniques may be used to determine positions (x, y, z) on a graphical representation of an object presented on a two dimensional display.

In this example, the user 102 is providing a rotation request via the touch-based display 105 using the user's fingertip 110. The rotation request can be any input such as a swipe across the graphical representation of the object that is translated into a rotation request to graphically rotate the object. In other implementations, rather than receiving the rotation request from the touch-based display 105, the image capture device 106 may capture images that are processed to identify a rotation request, such as a gesture or motion, gaze tracking, head tracking, feature tracking, or expression recognition. In this example, the user 102 may move their eyes between different points on the display 105. Using at least one of the cameras 106 on the device, the device can capture image information including at least a portion of the eye motion, analyze the image information using at least one image or video analysis algorithm, and determine movement of the user's eyes (gaze tracking) between subsequent frames. In addition, a ray casting algorithm may be used to virtually cast a ray in the direction of the user's determined gaze and identify the corresponding pixel(s) of the graphically represented object to determine the three positions (x, y, z positions) of the input with respect to the object. Such detection may be used to determine a direction in which a graphical representation of the object is to be rotated and/or to identify an item for which details are to be provided.

In some implementations, a rotation request and/or request for details about an item may be provided through different input components. For example, the input pattern may be received through the touch-based display as a touch-based input, through a camera as an image-based input (e.g., gaze tracking or head tracking), and the like.

In some instances, having a single camera or only a touch-based display on the device might be insufficient to provide all the desired input to the device for various inputs. For example, certain rotation requests might consider a distance-dependent component such that a single camera might not be sufficient to provide the necessary distance information, at least without complicated image analysis algorithms. Using two or more cameras can provide depth information, which can enable the relative positions of objects near the device to be determined in three dimensions. Similarly, each camera may have a specific field of view, such that only having one or two cameras on the device might limit the ability of the device to capture input patterns in all or most directions around the device. Similarly, a single light source (e.g., LED) may provide illumination over a specific range of angles and may not provide adequate lighting in multiple directions.

Figures 2A, 2B:
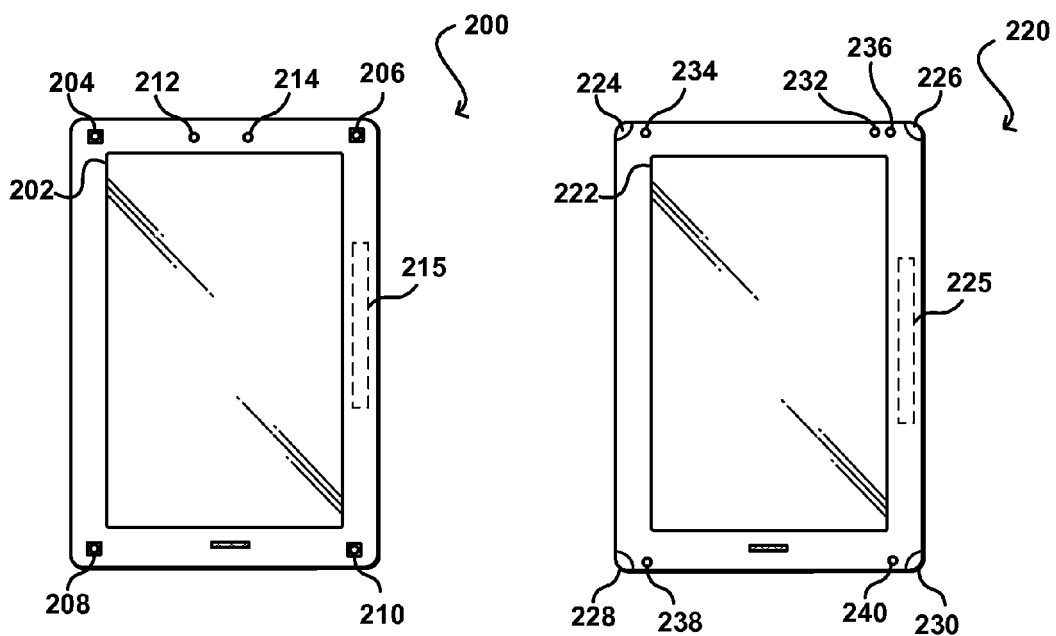
FIGS. 2(A) and 2(B) illustrate example device configurations that can be utilized in accordance with various implementations.

FIG. 2(A) illustrates a first example device 200 including multiple components that can be used to capture various types of inputs in accordance with different implementations. It should be understood that, while the components of the example device are shown to be on a "front" of the device, there can be similar or alternative components on the sides or back of the device as well (or instead). Further, directions such as "top," "side," and "back" are used for purposes of explanation and are not intended to require specific orientations unless otherwise stated. In this example device 200, there are four cameras 204, 206, 208, 210 on a same side of the device as a display 202 (e.g., an LCD display screen). Using such an arrangement, the device likely will have at least one or two cameras facing the user at any time that are unobstructed by objects, such as by the user holding the device, which can at least partially obscure a view of at least a portion of the user to various cameras on the device. The display 202 may be a touch-based display. In at least some implementations, the display 202 provides for touch or swipe-based input using, for example, capacitive, resistive or IFSR touch technology.

In this example, the device 200 also includes an illumination element 212 operable to project illumination (e.g., white light or IR) in the direction of the user, to assist with image capture. The device also includes a light sensor 214 for use in determining when illumination might be needed. The device 200 may also include an accelerometer 215 for use in determining a position, orientation and/or movement of the device.

FIG. 2(B) illustrates another example device 220 wherein the cameras 224, 226, 228, 230 are positioned on the corners of the device. If the devices have a sufficient wide-angle lens (e.g., a fish-eye lens), the cameras can have at least partially overlapping fields of view such that the cameras might be able to capture input patterns from substantially any direction around the device. In this example, each camera also has an associated illumination element 234, 236, 238, 240 operable to direct light over a range of angles associated with a respective camera. Although the illumination elements are shown on the front of the device for convenience, it should be understood that the illumination elements can be on the corners of the device as well, and in at least some implementations can utilize the same wide-angle lenses to project light over a range of angles at least including the field of view of the respective camera. This example device can also include an accelerometer 225, a display 222, light sensor 232, and other such elements as discussed elsewhere herein. The display screen 222 may be a touch-based display. In at least some implementations, the display screen provides for touch or swipe-based input using, for example, capacitive, resistive or IFSR touch technology.

As discussed, an advantage of having a large number of cameras, illumination elements, touch-screens and other such input components is that inputs can be captured in a number of different directions with different inputs and input types without significant concern about obstructions or other such occurrences. In addition to cameras, accelerometers, and touch-based input, as discussed below, the devices may also include a variety of other input components, such as a gyroscope, inertial sensor, pressure sensor, microphone, a barometer, a global positioning system (GPS), a compass, and the like.

With the various types of input components, a user may provide a rotation request and/or details request for detail information about a displayed item. A details request may be any request for additional information about an item presented on the display. For example, if a calendar item is provided on the display, the user may provide a details request to obtain additional information about the calendar item, such as meeting time, attendees, subject, location, etc.

Figure 3:
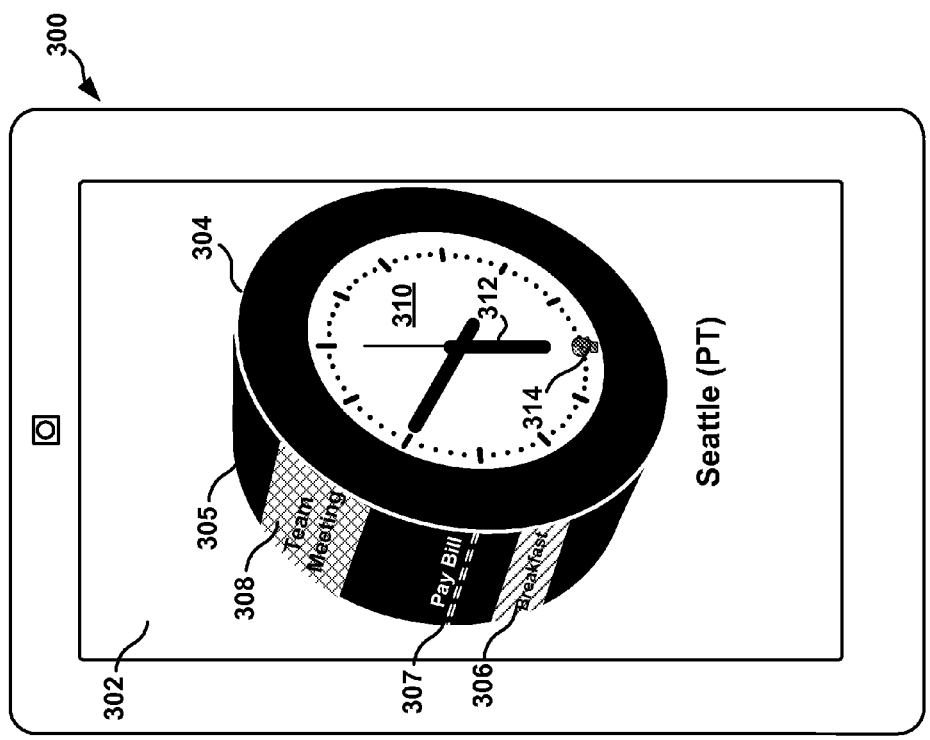

FIG. 3 is a block diagram of a graphical representation of a three-dimensional object, a clock 304 in this example, rotated on a display 302 of a device 300 in response to receiving a rotation request to rotate the object to the right, according to one implementation. As discussed above, a rotation request may be received via any input component, such as an accelerometer or touch-based display. For example, a user may physically rotate the device 300, providing a rotation request via an accelerometer and the graphical representation of the clock 304 may be rotated, as illustrated in FIG. 3. In some implementations, the rotation of the graphical representation of the three-dimensional object may be animated.

In this example, in addition to rotating the graphical representation of the clock 304, additional time-dependent item may be obtained and presented on the side surface area 305 of the clock 304 that is exposed as a result of the rotation. For example, time-dependent items may be calendar items 306, 308 and/or task items 307. Time-dependent items may be obtained directly from memory on the device, from an application local to the device and/or obtained from a remote location. The time-dependent items may be any time-based or time-dependent item, such as a meeting, event or activity, free-busy time information for individuals, free-busy time information for resources, free-busy time information for rooms, time zone information, a deadline for a task, etc. Likewise, the time-dependent items may be time-dependent items for the user of the device, time-dependent items for other individuals, or a combination of both a user's time-dependent items and other individual's time-dependent items. In some instances, a user may view time-dependent items that include both the user's time-dependent items and time-dependent items of other individuals. By viewing both the user's time-dependent items and those of other individuals, the user can identify potentially available times for which a meeting or other time-dependent item can be scheduled or if an existing time-dependent item can continue without conflicting with another time-dependent item.

In one example, if multiple individuals are currently participating in a meeting that is scheduled to end at 3:00 p.m. but is running long, the devices of each user in the meeting may share respective calendar information. In response to a user providing a rotation request to view a side of the clock 304 that corresponds with the current time, the user may be provided time-dependent items for each meeting participant. Based on that information, the user can quickly identify whether the meeting can continue or if one or more of the meeting participants has a conflict.

Returning to the example of FIG. 3, the current time is 5:50 a.m. and the user has provided a rotation request that has resulted in the graphical representation of the clock 304 rotating and exposing the side surface area 305 of the clock 304 that corresponds with the six hours between 6:00 and 12:00. Because it is 5:50 a.m., the time-dependent items that are obtained and displayed on the exposed side surface area 305 of the clock 304 correspond to the upcoming six hours between 6:00 a.m. and 12:00 p.m. In this example, the time-dependent items include the calendar items 306, 308 and task item 307. The calendar items 306, 308 and task item 307 are displayed on the graphical representation of the side surface area 305 of the clock 304 such that they are aligned with the corresponding times represented on the face 310 of the clock 304 adjacent to the exposed side surface area 305. For example, the calendar item 306 for "Breakfast" is scheduled to occur between 8:00 a.m. and 8:30 a.m. To represent this, the calendar item 306 is displayed on the exposed side surface area 305 of the clock 304 such that its size and location illustrates a start of the calendar item at a position that corresponds with a position of the hour hand 312 on the face 310 of the clock 304 when the actual time is 8:00 a.m. Likewise, the end location of the calendar item 306 is displayed to correspond with a position of the hour hand 312 on the face 310 of the clock 304 when the actual time is 8:30 a.m.

Other calendar items may be similarly presented. For example, the size and position of the calendar item 308 for "Team Meeting" is displayed on the side surface area 305 of the clock 304 to correspond with the scheduled time of the calendar item, in this example 10:00 a.m.-11:00 a.m. In comparison, the task item 307 only includes a due time of 9:00 a.m. In such an instance, the size of the representation of the calendar item 307 may be smaller, such as a single line or double dashed line, to illustrate that it only includes a due time. The task item 307 is positioned on the exposed side surface area 305 of the clock 304 such that it corresponds with a position of the hour hand 812 on the face 310 of the clock 304 when the actual time is 9:00 a.m.

In some instances, different forms of time-dependent items may be further distinguished by varying their respective graphical representations. For example, time-dependent items that are scheduled meetings, such as calendar items 306, 308 may be graphically represented to have a size corresponding to the start and end times for those meetings and presented in a solid color. In comparison, time-dependent items, such as task item 307 "Pay Bill" that only includes a due date, may be represented as double lines to distinguish the task item from calendar items.

Likewise, time-dependent items of a user may be visually distinguished from time-dependent items of other individuals, resources, rooms, etc. Also, time-dependent items of the user (or others) may be visually distinguished based on the type or category of the time-dependent item. For example, if a user has categorized some time-dependent items as personal, such as calendar item 306 "Breakfast" and some time-dependent items as business, such as calendar item 308 "Team Meeting", those time-dependent items may be graphically distinguished. As will be appreciated, any form or combination of time-dependent items may be graphically or visually distinguished.

By displaying the time-dependent items with a size and position that corresponds to respective start and end times and/or visually distinguishing different types or categories of time-dependent items, a user may quickly obtain an overview of the time-dependent items for a current or upcoming six hours.

In some implementations, time-dependent items may be graphically provided on other locations of the graphical representation of the three-dimensional object. For example, an alarm (time-dependent item) scheduled for 6:00 a.m. may be graphically represented on the face 310 of the clock 304 at a position that corresponds with the position of the hour hand 312 when the actual time is 6:00 a.m. A user may modify or obtain detail information about the alarm (e.g., the specific alarm time) by interacting with the graphical representation of the alarm 314. For example a user may move the graphical representation of the alarm 314 to another time on the face of the display 310 to reschedule the alarm activation time. Likewise, as discussed further below with respect to FIG. 5, a user may modify any time-dependent item by interacting with the representation of the time-dependent item.

Figure 4:
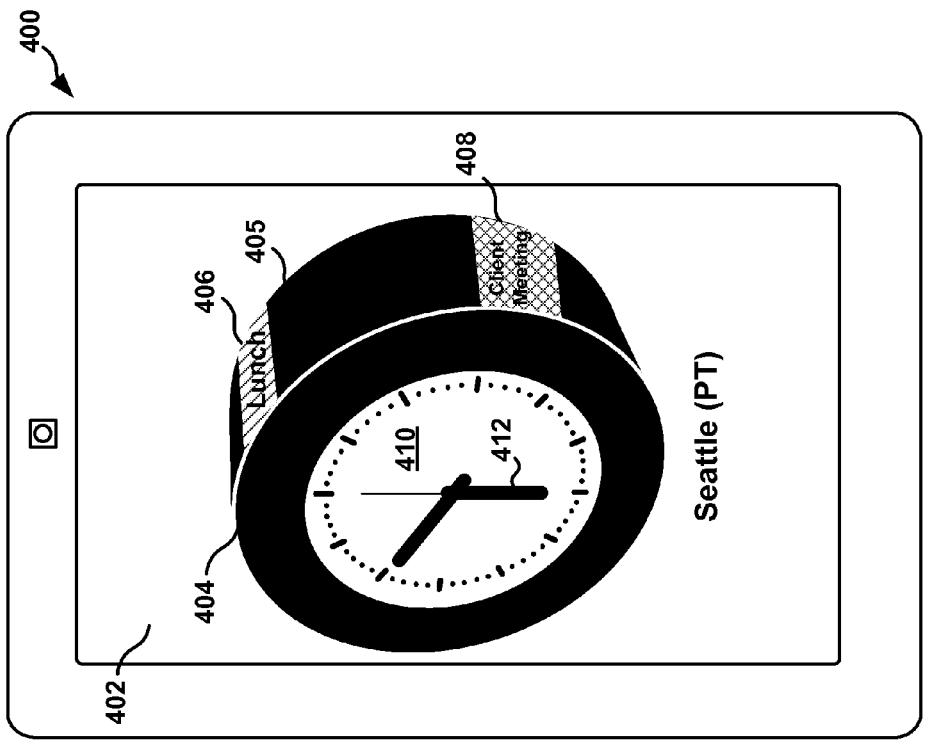
FIGS. 3-8 illustrate block diagrams of various graphical representations of a three-dimensional object presented on a display of a device, according to various implementations.

FIG. 4 is another block diagram of a graphical representation of a three-dimensional object, a clock 404 in this example, rotated on a display 402 of a device 400 in response to receiving a rotation request to rotate the object to the left, according to one implementation. As discussed above, a rotation request may be received via any input component, such as an accelerometer or touch-based display. For example, a user may physically rotate the device 400, providing a rotation request via an accelerometer and the graphical representation of the clock 404 may be rotated, as illustrated in FIG. 4.

Similar to FIG. 3, the current time is 5:50 a.m., but in this example the user has provided a rotation request that has resulted in the graphical representation of the clock 404 to rotate and expose the side surface area 405 of the clock 404 that corresponds with the six hours between 12:00 and 6:00. Because it is 5:50 a.m., the time-dependent items that are obtained and displayed on the exposed side surface area 405 of the clock correspond to the upcoming six hours between 12:00 p.m. and 6:00 a.m. In this example, the time-dependent item includes the calendar items 406, 408. The calendar items 406, 408 are displayed on the graphical representation of the clock 404 such that they are aligned with the corresponding times represented on the face 410 of the clock 404. For example, the calendar item 406 for "Lunch" is scheduled to occur between 12:30 p.m. and 1:00 p.m. To represent this, the calendar item 406 is displayed on the exposed side surface area 405 of the clock 404 such that its size and location illustrates a start of the calendar item at a position that corresponds with a position of the hour hand 412 on the face 410 of the clock 404 when the actual time is 12:30 p.m. Likewise, the end location of the calendar item 406 is displayed to correspond with a position of the hour hand 412 on the face 410 of the clock 404 when the actual time is 1:00 p.m.

Similar to FIG. 3 any form of time-dependent items may be graphically displayed on the exposed side surface area 405 of the clock 404 in accordance with the various implementations described herein. In general, when an exposed side surface area 405 of the clock 404 does not include the current time, the time-dependent items obtained and provided relate to an upcoming six hours. When an exposed side surface area 405 of the clock 404 does include the current time, the time-dependent items obtain and provided relate to the current six hours.

Figure 5:
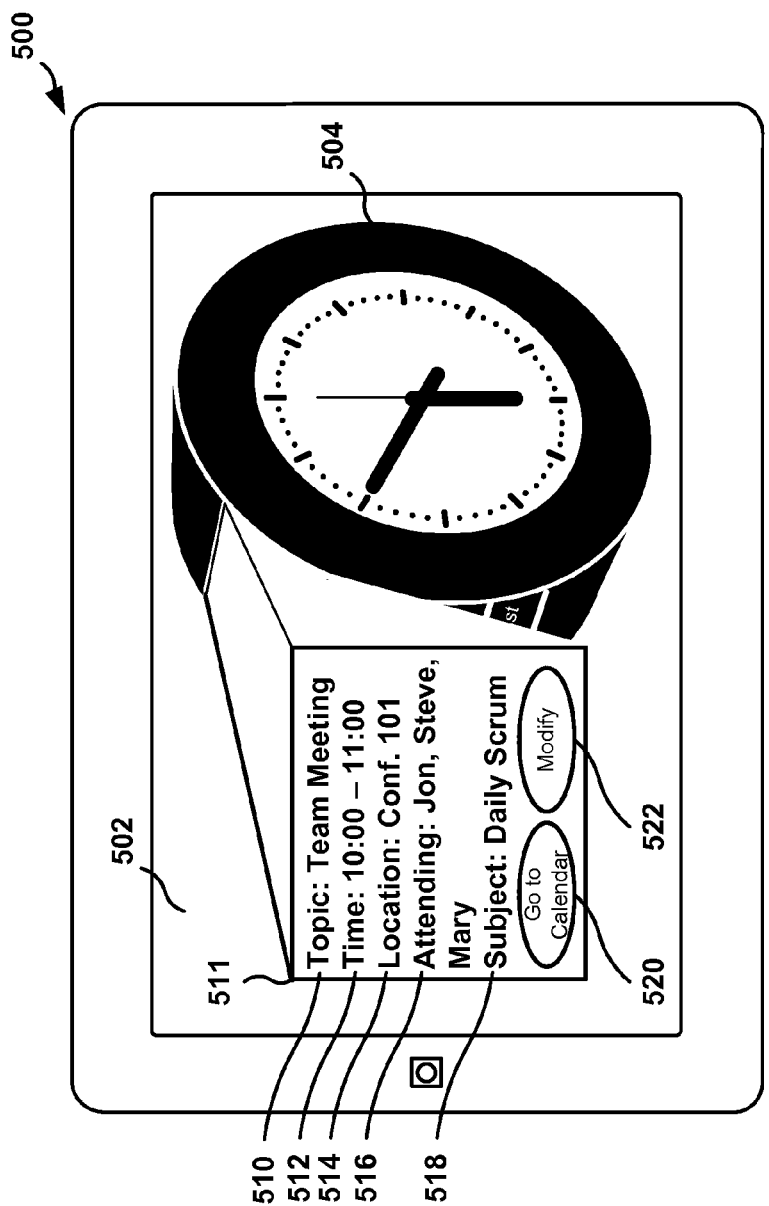

FIG. 5 is another block diagram of a graphical representation of a three-dimensional object, a clock 504 in this example, rotated on a display 502 of a device 500 in response to receiving a rotation request to rotate the object to the left, according to one implementation. In addition, detail information 511 about a time-dependent item is presented in response to a user providing a details request. As discussed above, a details request may be received via any input component, such as a touch-based display or via gaze tracking captured by a camera. For example, a user may touch a portion of the touch-based display 502 that corresponds with the time-dependent item and detail information 511 about that time-dependent item may be provided. In one implementation, ray casting may be used to determine the time-dependent item for which details are requested.

In this example a user has provided a details request for detail information associated with the time-dependent calendar item of "Team Meeting." As discussed above with respect to FIG. 3, the calendar item 308 for "Team Meeting" is graphically represented on the exposed side surface area 305 of the clock 304. A user may touch or otherwise interact with the calendar item and be provided detailed information 511 (FIG. 5). Detailed information may be any information associated with the time-dependent item represented on the display 502. For example, the calendar item for "Team Meeting" may include detailed information 511 such as the topic 510, specific time 512 for the scheduled meeting, the location 514 of the meeting, those attending 516 or invited to the meeting, and/or the subject 518 of the meeting. Detail information may be obtained from device memory, an application local to the device, obtained from one or more remote computing resources and/or obtained from another device.

In other implementations, rather than providing detail information, upon receiving a details request the corresponding application associated with the time-dependent item may be launched and the user provided direct access to the time-dependent item. For example, if the details request is for a calendar item, in some implementations, the corresponding calendar application may be activated and the corresponding calendar entry provided to the user. In other implementations, along with the detail information 511 a link or control button 520 may be included that provides the ability for the user to access the calendar or other corresponding application.

In some implementations, a user may also modify, add or delete time-dependent items. For example, an edit control button 522 to "Modify" the calendar item may be included in the detail information 511 provided in response to a details request. A user may select the modify control button 522 and modify any aspect of the time-dependent item. For example, a user may add additional members to a meeting, assign a task to a different person, change a due date for a task, extend the length of a meeting, modify an alarm activation time, etc. In some implementations, this may be done directly in the detail information 510 or the corresponding application may be accessed and the time-dependent item placed in an edit mode to allow the user to modify the time-dependent item.

Figure 6:
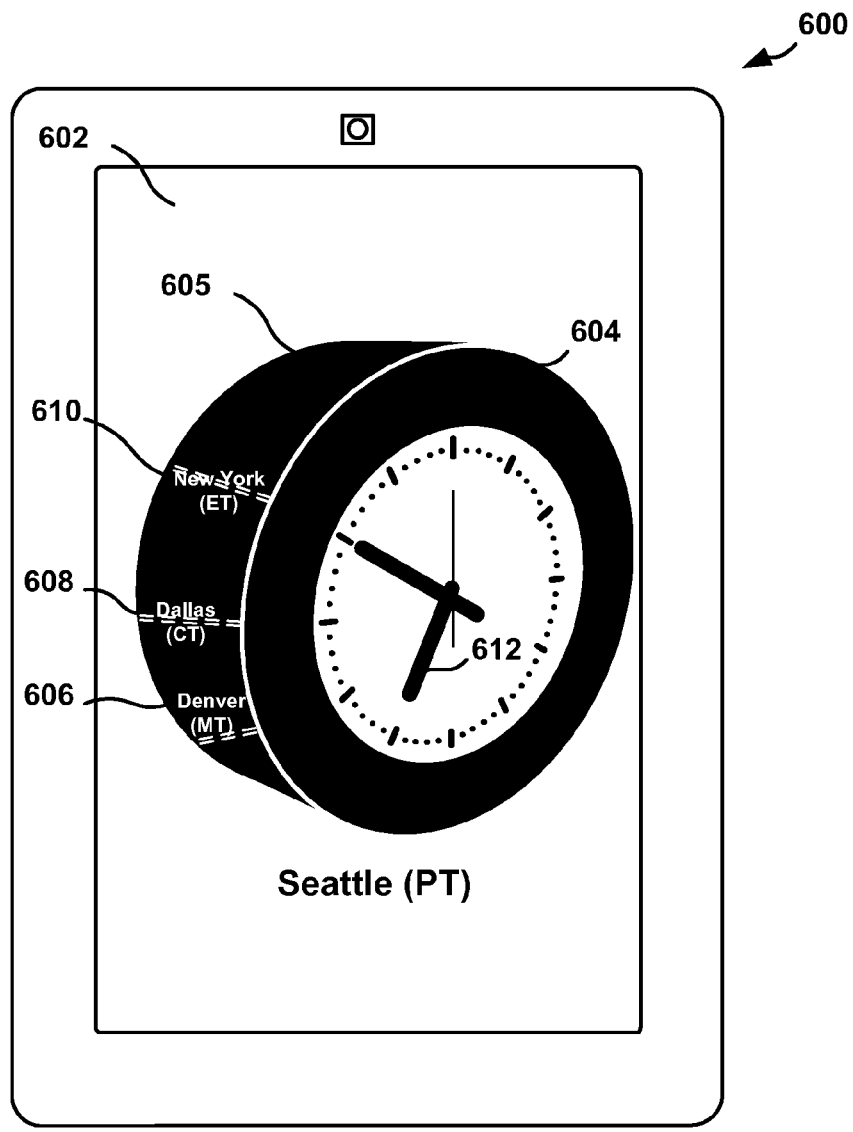

FIG. 6 is another block diagram of a graphical representation of a three-dimensional object, a clock 604 in this example, rotated on a display 602 of a device 600 in response to receiving a rotation request to rotate the object to the right, according to one implementation. As discussed above, a rotation request may be received via any input component, such as an accelerometer or touch-based display. For example, a user may physically rotate the device 600, providing a rotation request via an accelerometer and the graphical representation of the clock 604 may be rotated, as illustrated in FIG. 6.

The example depicted in FIG. 6 is similar to that described above with respect to FIGS. 3-5. However, in this example, the time-dependent items relate to different time zones. For example, the actual time represented by the clock 604 is 7:50 p.m. PT. The time-dependent items displayed on the exposed side surface area 605 are the corresponding times in different time zones or different cities. For example, the corresponding Mountain Time 606 in the city of Denver is 8:50 p.m., the Central Time 608 in Dallas is 9:50 p.m. and the Eastern Time 610 in New York is 10:50 p.m. Similar to the time-dependent items discussed above, a user my provide a details request and obtain detail information about any of the time-dependent items 606, 608, 610. For example, a user my touch the touch-based display 602 of the device 600 at a location that corresponds with the time-dependent item for Mountain Time 606 and obtain detail information about that item. For example, a user may be provided a list of major cities in the Mountain Time zone, a list of contacts located in the Mountain Time zone or provided the ability to select a different time zone for the time-dependent item.

To illustrate the time in respective time zones, the time-dependent items 606, 608, 610 for each time zone may be displayed on a portion of the exposed side surface area 605 such that it corresponds with the actual time in that time zone. For example, the time-dependent item for Mountain Time 606 is at a position that corresponds with a position of the hour hand 612 on the face 610 of the clock 604 that corresponds with the actual hour in the Mountain Time zone. Likewise, time-dependent item for Central Time 608 is at a position that corresponds with a position of the hour hand 612 on the face 610 of the clock 604 that corresponds with the actual hour in the Central Time zone and the time-dependent item for Eastern Time 610 is at a position that corresponds with a position of the hour hand 612 on the face 610 of the clock 604 that corresponds with the actual hour in the Mountain Time zone.

In some implementations, the user may provide a rotation request to expose other side surface areas of the clock 604 and be provided time-dependent items positioned on the surface area of a clock to correspond to the time in other respective time zones.

Figure 8:
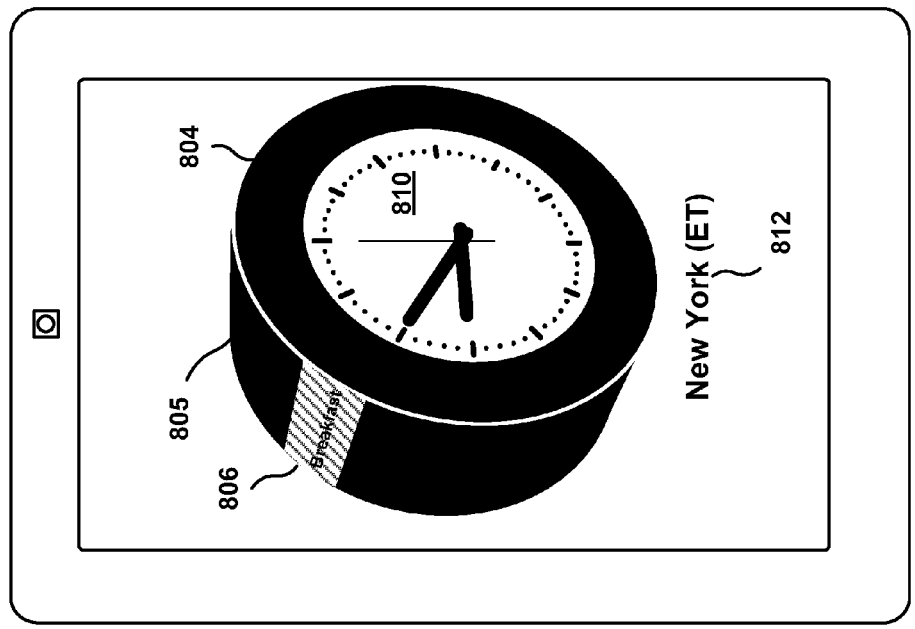
Figure 7:
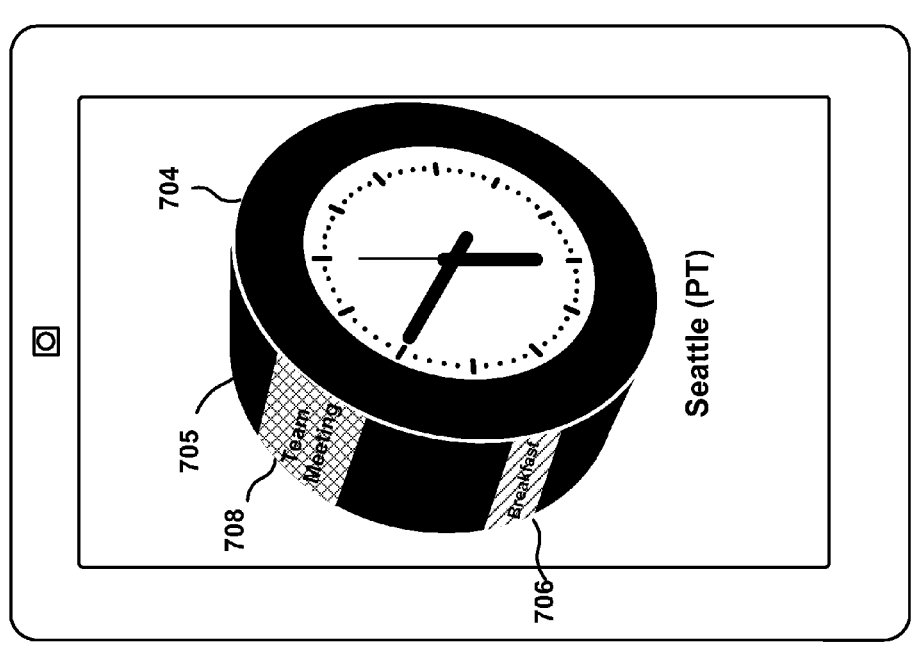

In some implementations, when a rotation request is received a determination may be made as to whether the rotation request exceeds a rotation threshold. For example, if the user provides a rotation request beyond a predetermined rotation range (e.g., 45 degrees), rather than rotating the graphical representation of the three-dimensional object to expose a side surface area, the graphical representation of the three-dimensional object may be completely rotated to expose an opposing face surface area. Referring to FIG. 7, a user may provide a rotation request that does not exceed a rotation threshold and the graphical representation of a three-dimensional object, in this example a clock 704, is rotated to expose a side surface area 705. Additionally, as discussed above, time-dependent items 706, 708 may be graphically represented at corresponding times on the side surface area 705 of the clock 704. However, if the user continues to provide a rotation request, or provides a subsequent rotation request that exceeds a rotation threshold, the graphical representation of the clock 704 may be completely rotated to expose an opposing face surface area 810, as if the clock is being turned around and has a second clock on the opposing side, as illustrated in FIG. 8. In this example, the opposing face surface area 810 provides an alternative time zone, such as Eastern Time 812. Likewise, the clock 804 may also receive a rotation request such that a side surface area 805 of the clock 804 is exposed and time-dependent items obtained and displayed. In this example, the time-dependent item is shifted to correspond with the time in which those events will occur according to Eastern Time 812. For example, the time-dependent item 706 for "Breakfast" that is displayed to correspond with a start time of 8:00 a.m. PT is shifted on the side surface area 805 of the clock 804 such that the representation of the time-dependent item 806 for "Breakfast" corresponds with the time at which that time-dependent item 806 will occur in the Eastern Time zone—11:00 a.m.

The information provided on the opposing surface area of the representation of the three-dimensional object may be any type of time based information. For example, it may be a clock in different time zone, an alarm, a calendar, tasks, a timer, a stop watch, etc. Likewise, while this example describes a three-dimensional object of a clock with two opposing sides, in other implementations the graphical representation of the three-dimensional object may include multiple faces rather than two opposing faces. Each face may include additional or alternative time-based and/or time-dependent information.

Figure 9:
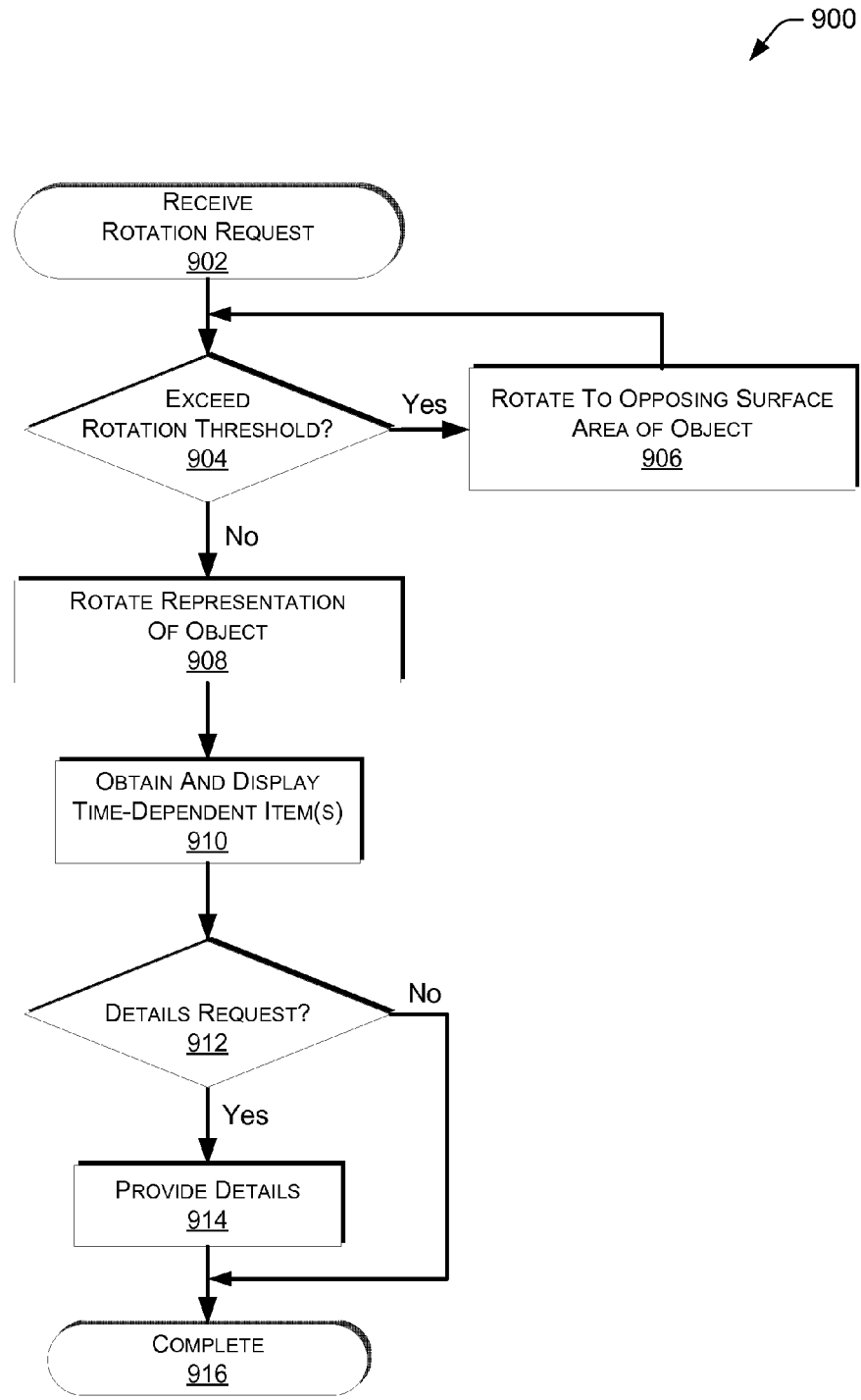
FIG. 9 is a flow diagram of an example process for displaying time-dependent items on a graphical representation of a three-dimensional object.

FIG. 9 is a flow diagram of an example process 900 for displaying time-dependent items on a graphical representation of a three-dimensional object. For example, a graphical representation of a clock may be provided and the example process 900 provides an implementation for displaying time-dependent items on a surface area of the clock. The example process 900 is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 900 may be initiated by a user providing a rotation request to rotate the graphical representation of a three-dimensional object displayed on a display of a device, as in 902. A rotation request may be provided by any of a variety of input components. For example, a rotation request may be received by a user physically rotating a device and an accelerometer (input component) detecting the rotation. In other implementations, a user may move their head to the side of the device and an image capture component (input component) may capture a sequence of images and through use of a gaze or head tracking determine a rotation request. In still another example, a user may provide a rotation request via a touch-based display by touching a graphical representation of a three-dimensional object and swiping their finger across the display of the device to provide a rotation request gesture. Any form of input component may be used for receiving a rotation request.

Upon receiving a rotation request, a determination may be made as to whether the received rotation request exceeds a rotation threshold, as in 904. A rotation threshold may be any predetermined rotation range or rotation velocity. For example, a rotation threshold may be 45 degrees from normal. If it is determined that the rotation threshold has been exceeded, the graphical representation of the three-dimensional object may be rotated to expose an opposing surface of the three-dimensional object, as in 906. In some implementations, the opposing surface area may provide additional and/or alternative time-based information, such as a face of a clock in a different time zone, a calendar, tasks, a timer, a stopwatch, etc. Upon rotating the graphical representation of the three-dimensional object to expose an opposing surface area, the example process 900 returns to decision block 904 and continues. In other implementations the opposing surface area may only be exposed for a predetermined period of time (e.g., ten seconds). In such an implementation, after the predetermined period of time has expired, the graphical representation of the three-dimensional object may return to its original orientation. In other implementations, if there are multiple face surface areas, each face may be accessed sequentially if the rotation request continues to exceed the predetermined rotation threshold and/or upon receiving a subsequent rotation request that exceeds the predetermined rotation threshold.

If it is determined that the rotation request does not exceed the rotation threshold, the graphical representation of the three-dimensional object may be rotated an amount that corresponds with the received rotation request, thereby exposing a side surface are of the three-dimensional object, as in 908. In other implementations, the object may be rotated a predetermined amount to expose a side surface area of the object. In some implementations, if the three-dimensional object is a round analog clock, when the graphical representation of the clock is rotated, it may be rotated an amount that exposes a side surface area that correspond with six hours on the clock.

In addition to rotating the graphical representation of the three-dimensional object, the example process 900 may obtain time-dependent items that correspond with a portion of the object, as in 910. For example, if the object is a clock and it is rotated to expose a side surface area adjacent to the times between 6:00 and 12:00 and it is currently 6:15 a.m., time-dependent items between 6:00 a.m. and 12:00 p.m. may be obtained and displayed on the exposed surface area of the clock. Likewise, if the current time is 6:15 a.m. and the device is rotated such that the side surface area of the clock adjacent to the times between 9:00 and 3:00 is exposed, the example process may obtain time-dependent items for the times between 9:00 a.m. and 3:00 p.m. In general, the obtained time-dependent items are either for the current six hours on the face of the clock adjacent to the exposed surface area if the current time is within that six hours or the upcoming six hours on the face of the clock adjacent to the exposed surface area if the current time is not currently within those six hours.

In addition, the time-dependent items may correspond to a user of the device, to other individuals, to resource availability, room availability and/or any combination thereof. Likewise, the time-dependent items may be obtained from memory or applications local to the device or from remote resources, such as remote computing resources or other devices.

Returning to the example process 900, once the obtained time-dependent items are graphically displayed, a determination may be made as to whether a details request is received for one of the time-dependent items, as in 912. As discussed above, a details request is a request for additional information and/or to modify a time-dependent item. A details request may be provided by any input component. For example a user may touch a graphical representation of a time-dependent item on a touch-based display. If it is determined that a details request for a time-dependent items has been received, detail information about the time-dependent item is provided, as in 914. In some implementations, the detail information may be obtained when the time-dependent item is obtained. In other examples, the detail information may be obtained in response to a details request for a particular time-dependent item. In addition, the detail information may be provided directly to the user, while in other implementations the corresponding application from which the time-dependent item is obtained may be activated and the detail information provided through the application.

Upon providing the requested detail information, or if it is determined at decision block 912 that a details request has not been received, the example process 900 completes, as in 916.

Figure 10:
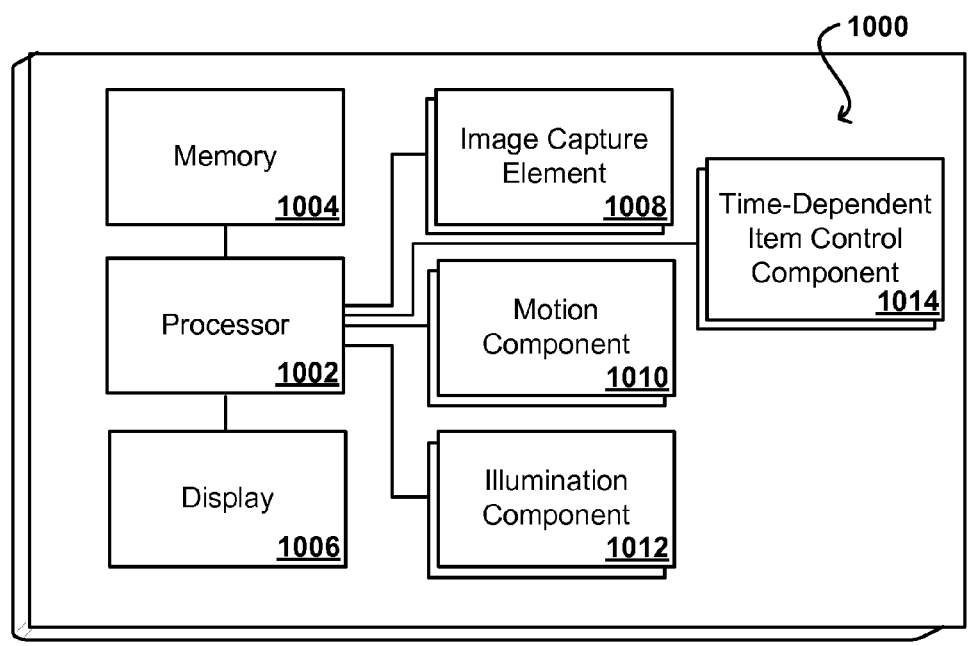
FIG. 10 illustrates an example configuration of components of a computing device such as that illustrated in FIGS. 2(A)-8.

In order to provide the various functionality described herein, FIG. 10 illustrates an example set of basic components of a computing device 1000, such as the devices described with respect to FIGS. 2(A)-8. In this example, the device includes at least one central processor 1002 for executing instructions that can be stored in at least one memory device or element 1004. As would be apparent to one of ordinary skill in the art, the device can include many types of memory, data storage or computer-readable storage media, such as a first data storage for program instructions for execution by the processor 1002. The same or separate storage can be used for images or data and a removable storage memory can be available for sharing information with other devices, etc. The device typically will include some type of display element 1006, such as a touch-based display, electronic ink (e-ink), organic light emitting diode (OLED) or liquid crystal display (LCD), although devices such as portable media players might convey information via other means, such as through audio speakers. In at least some implementations, the display screen provides for touch or swipe-based input using, for example, capacitive, resistive or IFSR touch technology.

As discussed, the device in many implementations will include at least one image capture element 1008, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can include at least one motion component 1010, such as an accelerometer, compass, inertial sensor, or electronic gyroscope, operable to detect changes in the position and/or orientation of the device. The device also can include at least one illumination element 1012, which may include one or more light sources (e.g., white light LEDs, IR emitters, or flash lamps) for providing illumination and/or one or more light sensors or detectors for detecting ambient light or intensity, etc. The device can also include at least one time-dependent item control component 1014 that stores and obtains one or more time-dependent items and/or detail information about those time-dependent items.

The example device can include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through a combination of visual (e.g., gesture) and audio (e.g., spoken) commands such that a user can control the device without having to be in contact with the device.

Figure 11:
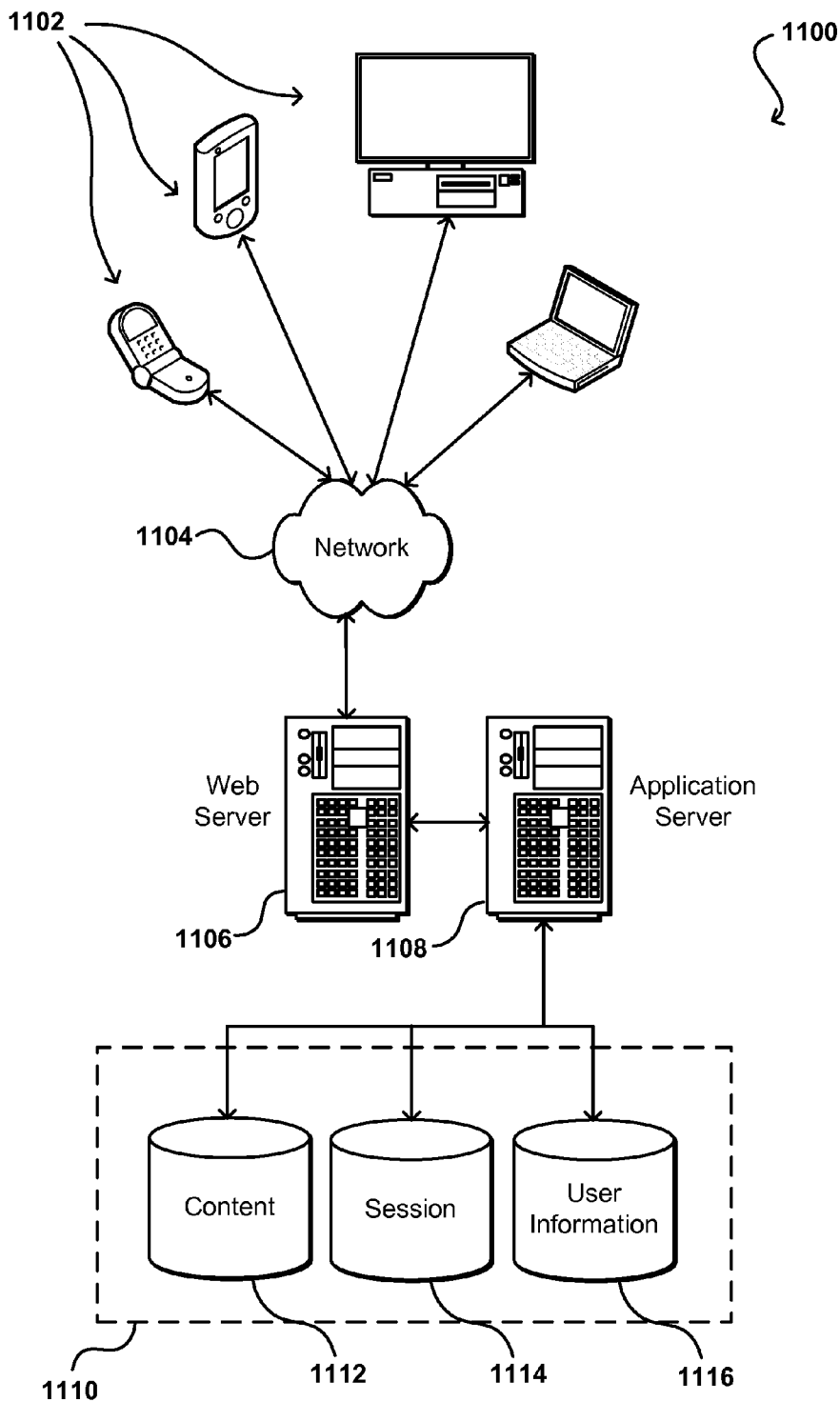
FIG. 11 illustrates an example environment in which various implementations may be performed.

As discussed, different approaches can be implemented in various environments in accordance with the described implementations. For example, FIG. 11 illustrates an example of an environment 1100 for implementing aspects in accordance with various implementations. As will be appreciated, although a Web-based environment is used for purposes of explanation, different environments may be used, as appropriate, to perform various implementations. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network 1104 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides, for example, time-dependent items and detail information in cooperation with the data store and is able to generate content such as text, graphics, audio and/or video to be transferred to the user. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side and also provide time-dependent items and detail information to different devices 1102. The data store is also shown to include a mechanism for storing log or session data 1114. It should be understood that there can be many other aspects that may need to be stored in the data store, such as display configuration information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a details request for a particular time-dependent item. In this case, the data store might access the user information to verify the identity of the user and can access the time-dependent item to obtain detail information about the particular item. The information can then be returned to the user, such that the user is able to view the detail information on the user device 1102.

Each server typically will include an operating system that provides executable program instructions for the general administration and operation of that server and typically will include computer-readable medium storing instructions that, when executed by a processor of the server, allows the server to perform its intended functions. Suitable implementations for the operating system and general functionality of the servers are known or commercially available and are readily implemented by persons having ordinary skill in the art, particularly in light of the disclosure herein.

The environment in one implementation is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various implementations can be further implemented in a wide variety of operating environments, which in some cases can include one or more user computers or computing devices which can be used to operate any number of applications. User or client devices can include any number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Some implementations utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network or any combination thereof.

In implementations utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of implementations, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate implementations may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information. This may include computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to provide the various implementations.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for providing time-dependent items on a display of a first device, comprising:
    under control of one or more computing systems configured with executable instructions,
        receiving a rotation request;
        rotating a graphical representation of a clock on the display of the first device to expose a side surface area of the clock;
        determining a six-hour period presented on a face of the clock adjacent to the side surface area of the clock;
        displaying on at least a first portion of the side surface area of the clock a first time-dependent item corresponding with at least a first portion of the six-hour period presented on the face of the clock adjacent to the side surface area of the clock, wherein the first time-dependent item is associated with a first user;
        receiving from a second device, a second time-dependent item that is associated with a second user of the second device, wherein the second user is different than the first user; and
        displaying on at least a second portion of the side surface area of the clock and with the first time-dependent item, the second time-dependent item to provide an indication of a time during the six-hour period that is available for both the first user and the second user.

2. The computer-implemented method of claim 1, wherein the first time-dependent item is a calendar item.

3. The computer-implemented method of claim 1, further comprising:
    receiving a details request for the first time-dependent item; and
    displaying detail information associated with the first time-dependent item.

4. The computer-implemented method of claim 3, wherein the first time-dependent item is a meeting and the detail information includes at least one of a start time, an end time, a meeting participant list, a meeting subject, a meeting location, or a resource.

5. The computer-implemented method of claim 1, wherein the rotation request is received from an input component, wherein the input component is at least one of a touch-based display, a camera, an accelerometer, a gyroscope, an inertial sensor, a pressure sensor, a microphone, or a compass.

6. A non-transitory computer-readable storage medium storing instructions that when executed by a processor cause the processor to at least: display on a display of a first device, a first graphical representation of a first face surface area of a three-dimensional object;
   display on the display of the first device, a second graphical representation of a first time-dependent item associated with a first user of the device, wherein the second graphical representation of the first time-dependent item is displayed on at least a portion of the first graphical representation of the first face surface area of the three-dimensional object;
   receive from a second device, a second time-dependent item that is associated with a second user of the second device, wherein the second user is different than the first user;
   display on the display of the first device, a third graphical representation of the second time-dependent item associated with the second user;
   receive a rotation request;
   determine if the rotation request exceeds a rotation threshold;
   if it is determined that the rotation request exceeds the rotation threshold:
      display on the display of the first device, a fourth graphical representation of a second face surface area of the three-dimensional object, without displaying the first graphical representation of the first face surface area of the three-dimensional object; and
      display on the display of the first device, a fifth graphical representation of the first time-dependent item associated with the first user of the first device, wherein the fifth graphical representation of the first time-dependent item is displayed on at least a first portion of the fourth graphical representation of the second face surface area of the three-dimensional object; and
      display on the display of the first device, a sixth graphical representation of the second time-dependent item associated with the second user, wherein the sixth graphical representation of the second time-dependent item is displayed on at least a second portion of the fourth graphical representation of the second face surface area of the three-dimensional object.

7. The non-transitory computer-readable storage medium of claim 6, wherein the first graphical representation of the first face surface area of the three-dimensional object is rotated.

8. The non-transitory computer-readable storage medium of claim 6, wherein the three-dimensional object is a clock.

9. The non-transitory computer-readable storage medium of claim 6, wherein the first face surface area includes a face of a first clock.

10. The non-transitory computer-readable storage medium of claim 9, wherein the second face surface area includes a face of a second clock.

11. The non-transitory computer-readable storage medium of claim 10, wherein the face of the first clock and the face of the second clock represent different time zones.

12. The non-transitory computer-readable storage medium of claim 11, wherein:
   a first position of the display of the second graphical representation of the first time-dependent item is based at least in part on a start time associated with the first time-dependent item in a first time zone; and
   a second position of the display of the fifth graphical representation of the first time-dependent item is based at least in part on the start time associated with the first time-dependent item in a second time zone.

13. The non-transitory computer-readable storage medium of claim 6, wherein the first time-dependent item is at least one of a calendar item, a task, an event, free-busy time information for the first user, free-busy time information for at least one resource, free-busy time information for at least one room, weather, news, an alarm, or time zone information.

14. The non-transitory computer-readable storage medium of claim 6, wherein if it is determined that the rotation request does not exceed the rotation threshold:
   display on the display of the first device, a seventh graphical representation of the first face surface area of the three-dimensional object;
   display on the display of the device, an eighth graphical representation of at least a portion of a side surface area of the three-dimensional object; and
   display the first time-dependent item on at least a portion of the at least a portion of the side surface area of the three-dimensional object.

15. The non-transitory computer-readable storage medium of claim 14, wherein the at least a portion of the side surface area of the three-dimensional object is approximately half of a side surface area of a clock and the first time-dependent item corresponds with a current six hours represented on the face surface area of the three-dimensional object adjacent to the side surface area.

16. The non-transitory computer-readable storage medium of claim 14, wherein the at least a portion of the side surface area is approximately half of a side surface area of a clock and the first time-dependent item corresponds with an upcoming six hours represented on the first face surface area of the three-dimensional object adjacent to the side surface area.

17. A computing system, comprising:
   one or more processors; and
   a memory coupled to the one or more processors and storing program instructions that when executed by the one or more processors cause the one or more processors to at least:
      send for display on a display of a first device a representation of a first view of a clock;
      receive a rotation request;
      in response to a determination that the rotation request does not exceed a rotation threshold, send for display on the display of the first device a representation of a second view of the clock that includes at least a representation of a face of the clock and a portion of a side of the clock;
      determine a six-hour period presented on the face of the clock adjacent to the portion of the side of the clock;
      send for display on the display of the first device a first representation of a first time-dependent item, wherein the first time-dependent item is associated with a first user and displayed on at least a portion of the side of the clock at a first position that corresponds with at least a first portion of the six-hour period presented on the face of the clock; and
      send for display on the display of the first device and with the first time-dependent item, a second representation of a second time-dependent item, wherein the second time-dependent item is associated with a second user of a second device and displayed on at least the portion of the side of the clock at a second position that corresponds with at least a second portion of the six-hour period presented on the face of the clock, wherein:

the second user is different than the first user; and the display of the first time-dependent item and the second time-dependent item provides an indication of a time that is available for both the first user and the second user.

18. The computing system of claim 17, the program instructions that when executed by the one or more processors further cause the one or more processors to at least:

animate a rotation of the clock between the first view of the clock and the second view of the clock.

19. The computing system of claim 17, the program instructions that when executed by the one or more processors further cause the one or more processors to at least:

receive a details request; and send for display detail information corresponding to the first time-dependent item.

20. The computing system of claim 17, wherein the rotation request is received from an input component, wherein the input component is at least one of a touch-based display, a camera, an accelerometer, a gyroscope, an inertial sensor, a pressure sensor, a microphone, or a compass.

21. The computing system of claim 17, wherein:

the representation of the first time-dependent item is displayed at a position on at least a portion of the second view of the clock to correspond with a start time associated with the first time-dependent item; and the representation of the first time-dependent item is displayed having a size representative of a time duration of the first time-dependent item.

\* \* \* \* \*